United States Patent [19]

Higuchi et al.

[11] 4,025,863
[45] May 24, 1977

[54] REGULATING ELECTRIC POWER CIRCUIT ARRANGEMENT

[75] Inventors: Hobart Atsushi Higuchi; Lawrence Paul Trubell, both of San Jose, Calif.

[73] Assignee: International Business Machines Corporation, Armonk, N.Y.

[22] Filed: Aug. 4, 1975

[21] Appl. No.: 601,820

[52] U.S. Cl. ..................................... 321/18; 321/2
[51] Int. Cl.² ..................................... H02P 13/22
[58] Field of Search ............... 321/2, 14, 16, 18, 19, 321/45 R; 323/DIG. 1

[56] References Cited

UNITED STATES PATENTS

| | | | |
|---|---|---|---|
| 3,141,110 | 7/1964 | Corry | 321/2 |
| 3,388,311 | 6/1968 | De La Lastra | 321/16 |
| 3,432,737 | 3/1969 | Hunter et al. | 321/2 |
| 3,504,264 | 3/1970 | Suelzle | 321/16 |
| 3,701,937 | 10/1972 | Combs | 321/2 |
| 3,879,647 | 4/1975 | Hamilton et al. | 321/14 |

FOREIGN PATENTS OR APPLICATIONS

| | | | |
|---|---|---|---|
| 1,377,451 | 9/1964 | France | 321/45 R |
| 1,214,291 | 6/1959 | France | 321/2 |

Primary Examiner—William H. Beha, Jr.
Attorney, Agent, or Firm—George E. Roush

[57] ABSTRACT

The switching circuitry topology is arranged so that the transistors operate in a 1E mode, that is, the voltage across the switching transistors is no greater than the input voltage (E) and at the same time the noise voltage normally generated in regulating circuit arrangements employing transistor switching is greatly reduced. A filter inductor in the primary switching circuit protects the switching transistors from sudden current changes during overload and enables operation of the transistors below the 2E mode. Power is regulated by pulse width control of the switching transistors. One pair of switching transistors is arranged to control the direction of current through the transformer primary winding. Another pair of transistors is arranged for controlling the current in accordance with the width of applied switching pulses. The switch topology also is arranged so that no current ever attempts to flow in the reverse direction through a previously conducting primary circuit diode, hence the rectifying elements are never snapped off, and the less desirable reverse recovery effects are eliminated. Primary-to-secondary circuit isolation is afforded with interchangeable transformer coupling and optocoupling components which also improve immunity to noise.

8 Claims, 9 Drawing Figures

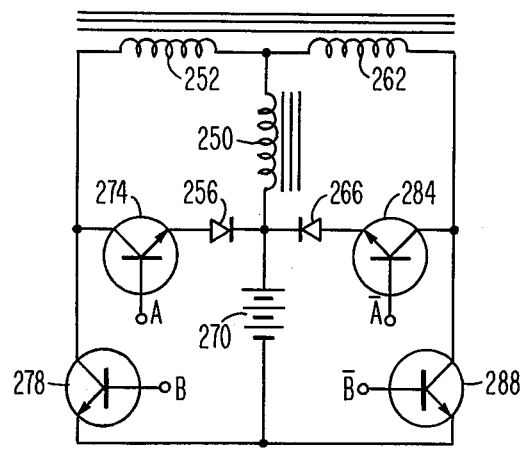
FIG. 5
PRIOR ART
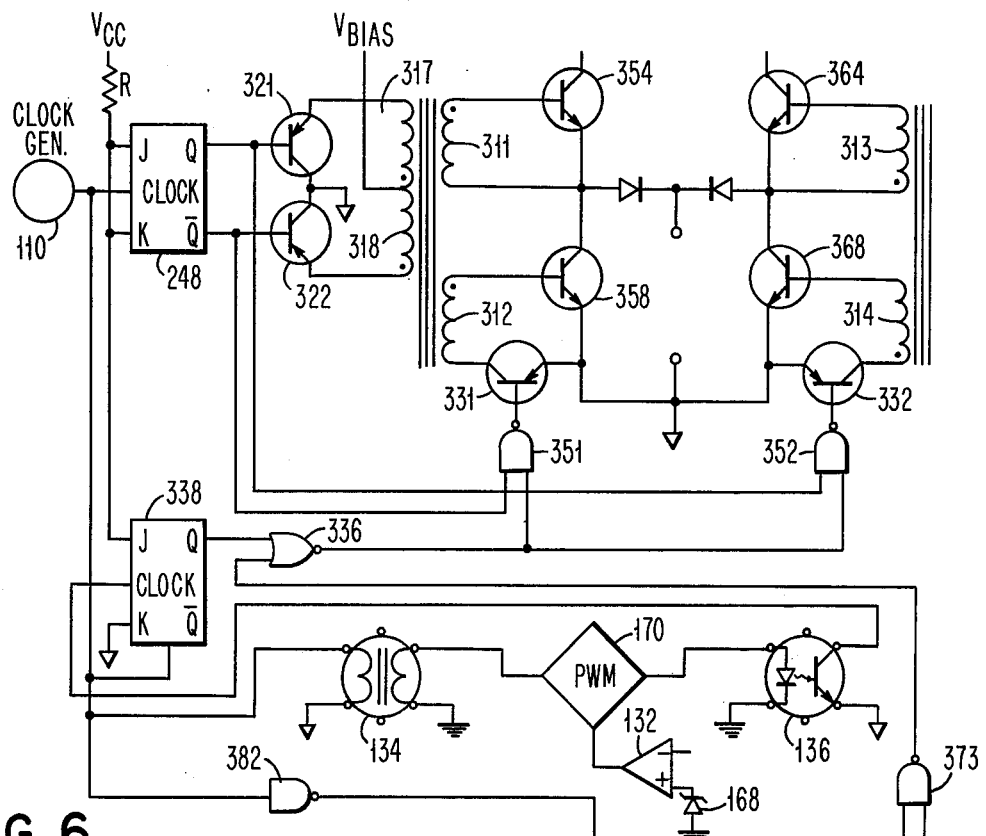
FIG. 6
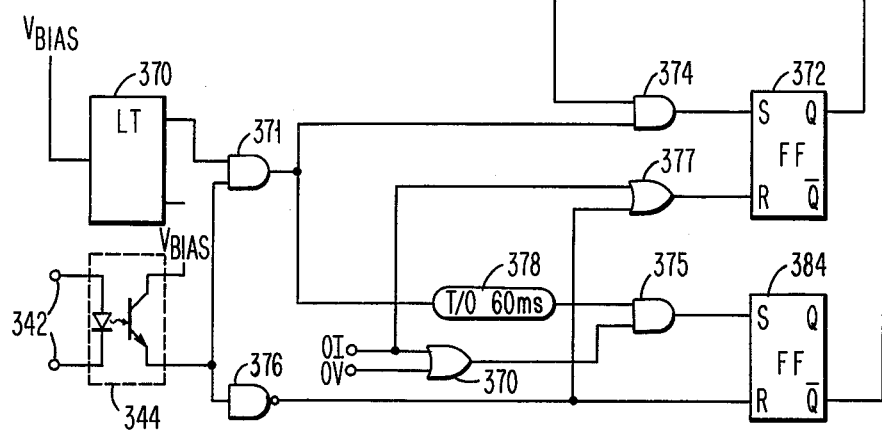

REGULATING ELECTRIC POWER CIRCUIT ARRANGEMENT

The invention is related to that disclosed and claimed in the copending U.S. patent application Ser. No. 487,410 of Hobart Atsushi Higuchi and Edward Leroy Mundrick, filed on July 10, 1974 for "Square Wave Generating Circuit Arrangement" and thereafter issued on Aug. 28, 1975 as U.S. Pat. No. 3,916,342. The generating circuit arrangement is used as a source of clocking wave for the circuit arrangement of the instant invention.

The invention relates to direct current inverter type power supplies and it particularly pertains to such power supplies adapted to deliver a precise output voltage irrespective of variations of input power voltage and/or variations in the load at the output of the power supply.

The prior art is replete with direct current inverter power regulating circuits; however, shortcomings are still evident. Electric noise brought about by the switching function and component breakdown, due to voltage surges, are two very important disadvantages.

The closest prior art of which the inventors are aware is found in the following U.S. Pat. Nos.:

| | | | |
|---|---|---|---|
| 3,074,030 | 1/1963 | Hierholzer | 331/113 |
| 3,243,686 | 3/1966 | Forster | 321/45 |
| 3,257,604 | 6/1966 | Colclaser et al | 321/45 |
| 3,308,372 | 3/1867 | Young et al | 321/45 |
| 3,317,812 | 5/1967 | Mesenhimer | 321/16 |
| 3,377,543 | 4/1968 | Wouk | 321/45 |
| 3,388,311 | 6/1968 | de la Lastra | 321/16 |
| 3,414,798 | 12/1968 | Nielsen | 321/2 |
| 3,624,483 | 11/1971 | Genuit | 321/2 |
| 3,636,430 | 1/1972 | Kernick et al | 321/9A |
| 3,760,258 | 9/1973 | Percorini et al | 321/11 |
| 3,805,139 | 4/1974 | Hoffman et al | 321/5 |

The switching circuitry of all the arrangements shown in these patents permit the voltage across a transistor to rise to as much as twice the input voltage value, a disadvantage which is overcome by the circuitry according to the invention.

The patents to Hierholzer, Forster, Young and Duffy, Wouk, Genuit, and Percorini et al. are all directed to circuit arrangements using silicon control rectifiers (SCR), thyristers, trinisters or other four region semiconductor devices which operate in a manner different from the operation of the switching circuitry according to the invention as will be brought out hereinafter. In addition, the patents of Hierholzer. Forster, Colclaser and Vore, Young and Duffy, Mesenhimer, and Percorini et al. are directed to bridge arrangements which are fully effective only when bridge elements are in balance. Such arrangements are no longer satisfactory for present day electric power requirements.

The patent to de la Lastra shows arrangements which are probably the closest art in that "variable duty drive" is taught, but switching transistors are subject to double voltage and switching SCR and/or diodes are subject to reverse voltage, during forward current conduction which are factors obviated in the circuitry according to the invention.

The patent to Nielsen is superficially similar in some respects, but the teaching there is directed to an optocoupling circuit which produces light varying in intensity according to the regulation in contradistinction to the circuitry according to the invention wherein the optocoupling link is arranged for binary circuit operation only, and the adverse effects of variable light intensity are not encountered.

The patent to Kernick et al. is directed to a circuit arrangement of which a portion is superficially similar to that of the invention. However, this arrangement is directed to rather complex circuitry for utilizing an a.c. reference voltage for generating pulse-width-modulating current for the inverter circuit. Additional differences in the two circuit arrangements will appear as the specification progresses.

The patent to Hoffman and Knickmeyer shows a prior art arrangement (in FIG. 8 of their patent) which has a tuned series circuit in the SCR switching circuit which arrangement is obviated by the circuit arrangement according to the invention.

As will be pointed out hereinafter, the circuit arrangement of the invention not only differs in structure from the prior art, but differs importantly in operation as well, and provides improved regulation at lower cost.

The objects of the invention indirectly referred to hereinbefore and those that will appear as the specification progresses, obtain in a regulating electric power inverter circuit arrangement comprising an electromagnetic transformer having a secondary winding at which an alternating current wave form of substantially constant potential is delivered and a primary winding having two terminals and a center tap. A direct potential, which may be subject to variations in value, is supplied for subsequently producing the alternating current output waveform. A direct current conducting element, preferable a filter inductor, is connected between one of the input terminals and the center tap of the primary winding. A pair of transistors are connected in series in current flowing polarity between one terminal of the primary winding and the other of the input terminals, while another pair of transistors connected in like manner between the other terminal of the primary winding and the other input terminal. The transistors have collector and emitter electrodes connected in the primary winding circuit and have base electrodes to which control circuitry is connected for periodically alternating current through the halves of the primary winding and varying the current through each of the pairs of transistors for maintaining the alternating current waveform substantially constant across the secondary winding. A brace of diodes are individually connected between the junctions between the transistor pairs and the one input terminal for continuing the current in each half of the primary winding for the full cycle.

An output voltage sensing circuit is coupled to the secondary winding and delivers an output voltage to a pulse width modulating circuit which is keyed by a clock wave generating circuit. The sensing circuit preferably delivers a direct voltage output, and a simple rectifier circuit is sufficient. The pulse width modulating circuit delivers a modulated pulse wave in accordance with the inverse of the amplitude of the secondary voltage for application to the control circuitry whereby the latter circuitry alters the duty cycle of two of the transistors in regulating the output alternating voltage wave.

Primary-secondary circuit isolation is achieved according to the invention by interchangeable pulse-type transformer circuits and optocoupling circuits which break the otherwise direct current connections between circuitry on the primary side of the transformer and circuitry on the secondary side.

In order that the advantages of the invention fully obtain in practice, a preferred embodiment thereof is described hereinafter, by way of example only, with reference to the accompanying drawing, forming a part of the specification and in which.

Figure 3:
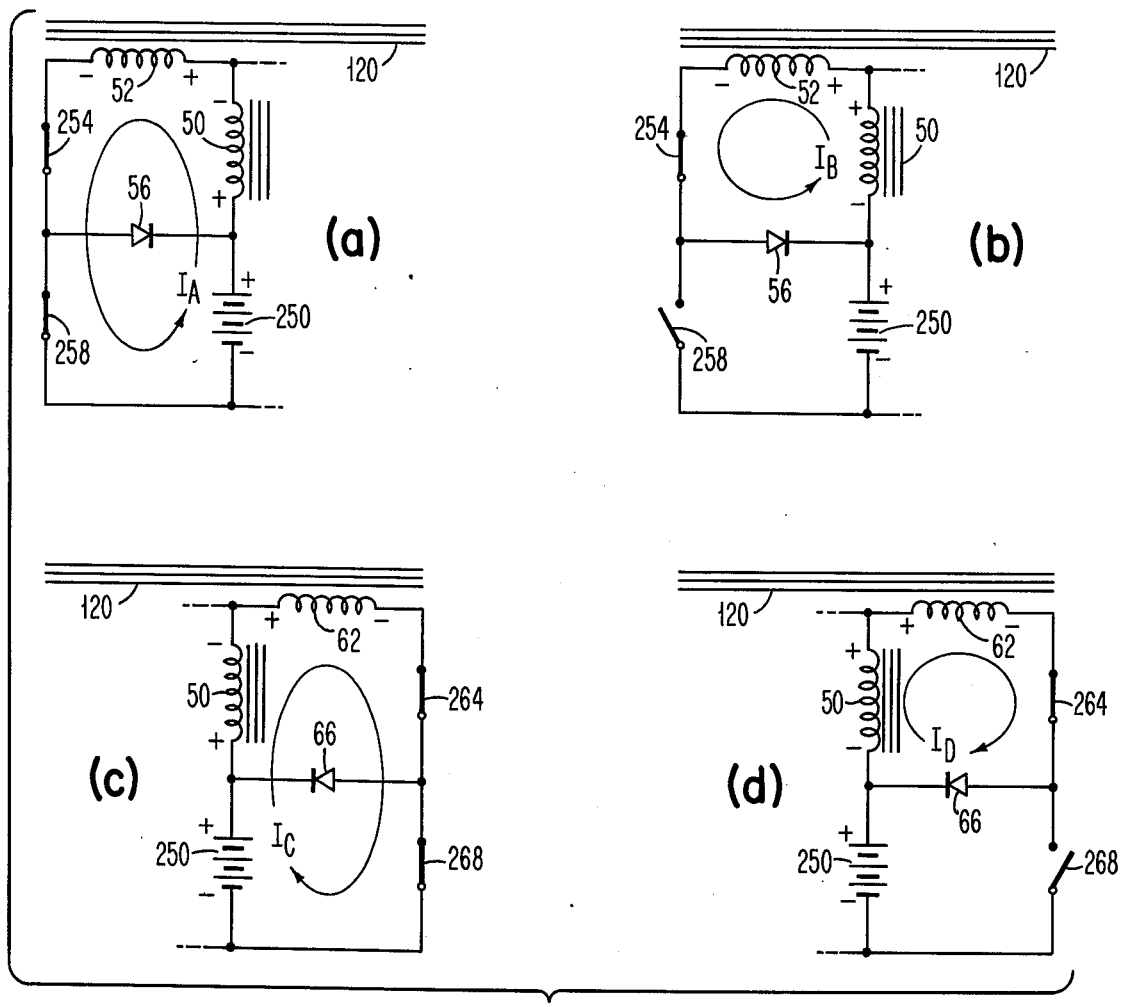
Figure 4:
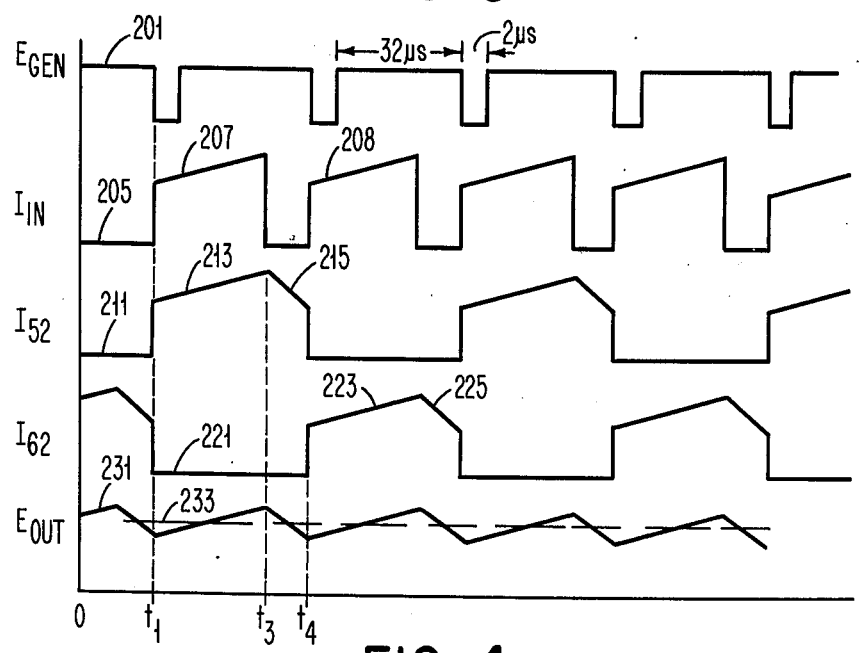

FIG. 3 — sections (a) (b) (c) and (d) being taken together — illustrates the operation of the switching circuitry according to the invention;

FIG. 4 is a graphical representation of wave forms illustrating the operation of circuitry according to the invention;

FIG. 5 is a schematic diagram of a prior art switching circuit useful in understanding important advantages of the circuitry according to the invention; and FIG. 6 is a schematic diagram of part of a relatively high voltage regulating power circuit according to the invention.

Figure 1:
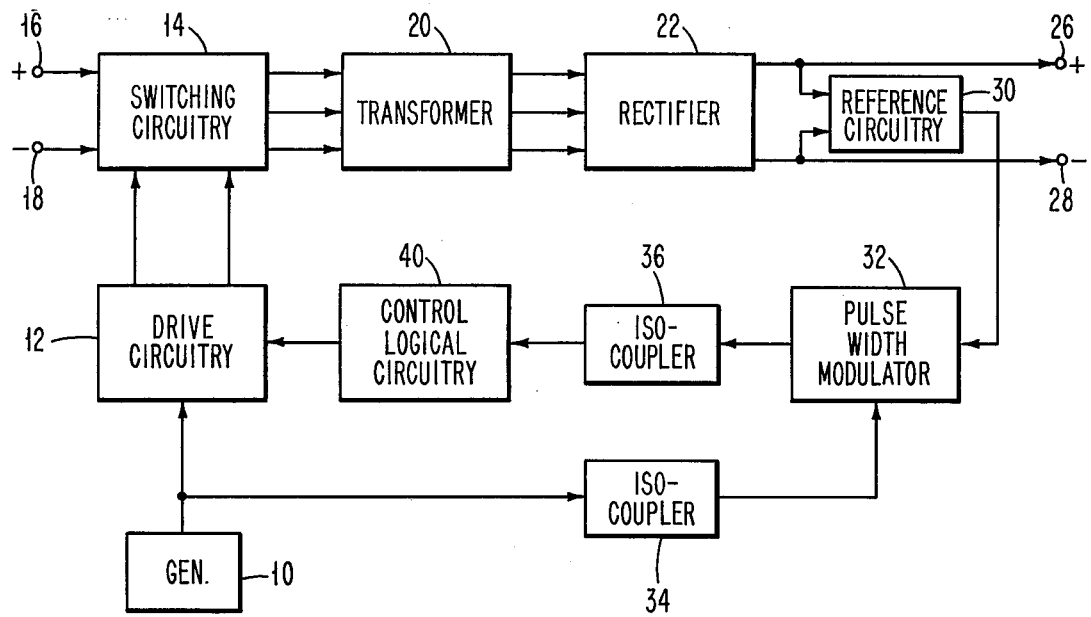
FIG. 1 is a functional diagram of a regulating electric power circuit arrangement according to the invention.

A functional diagram of a regulating electric power supply circuit arrangement is given in FIG. 1. Fundamentally, the circuit arrangement is that of an inverter-rectifier power supply. A clocking wave generator 10 is arranged to produce a substantially constant frequency and constant amplitude square wave for referencing the operation of the overall circuitry. Such a square wave generating circuit arrangement is that shown and described in the above-mentioned copending U.S. patent application Ser. No. 487,410. The clocking waveform from the generator 10 is applied to drive circuitry 12 for operating a switching circuit 14 in a manner to be described hereinafter. The switching circuit 14 is arranged to accept direct potential at input terminals 16,18 and apply that potential alternately to portions of the primary winding of a transformer 20 having a secondary winding in which a desired alternating voltage is induced. This alternating waveform voltage may be used as such in any utilization circuit desired. In a great many applications, the utilization circuitry requires direct current power. As shown, a rectifier 22 is connected to the transformer 20 for supplying direct potential at output terminal 26,28. In either case, control of the operation of the circuit is effected by sensing the amplitude of the output voltage. In practice, the amplitude is sensed right at the load or as close to it as possible. Where the output voltage is alternating current, a simple sensing rectifying circuit is preferred. As shown here, the load power rectifier 22 performs this function as well, and for the interest of simplicity, a reference circuit 30 is shown as connected at the terminals 26,28 for measuring the amplitude between these terminals for determining the error signal required. This error signal from the reference circuitry 30 is applied to a pulse width modulator circuit 32 to which a waveform from the generator 10 is applied. Because the pulse width modulator circuitry is located on the secondary side of the transformer 20, and the generator 10 is located on the primary side, the squarewave from the generator 10 is applied through an isocoupler circuit 34, later to be described, which passes an alternating component only of the wave to the pulse width modulator 32. The latter circuit produces a squarewave, timed by the output wave of the generator 10 and producing pulses of width inversely proportional to the amplitude of the voltage between the terminals 26,28. This output is passed through a second isocoupler circuit 36, which may be identical to the isocoupler circuit 34, for application to control logical circuitry 40. The latter circuitry derives a voltage waveform for application to the drive circuitry 12 tending to reduce the output voltage at the terminal 26,28 when the voltage rises thereat and to increase the output voltage when it tends to decrease at terminals 26,28. Thus, this servo system produces a substantially constant amplitude voltage at the terminals 26,28 despite changes in the load impedance and more especially despite variations in amplitude of the input voltage across the terminal 16,18.

Figure 2:
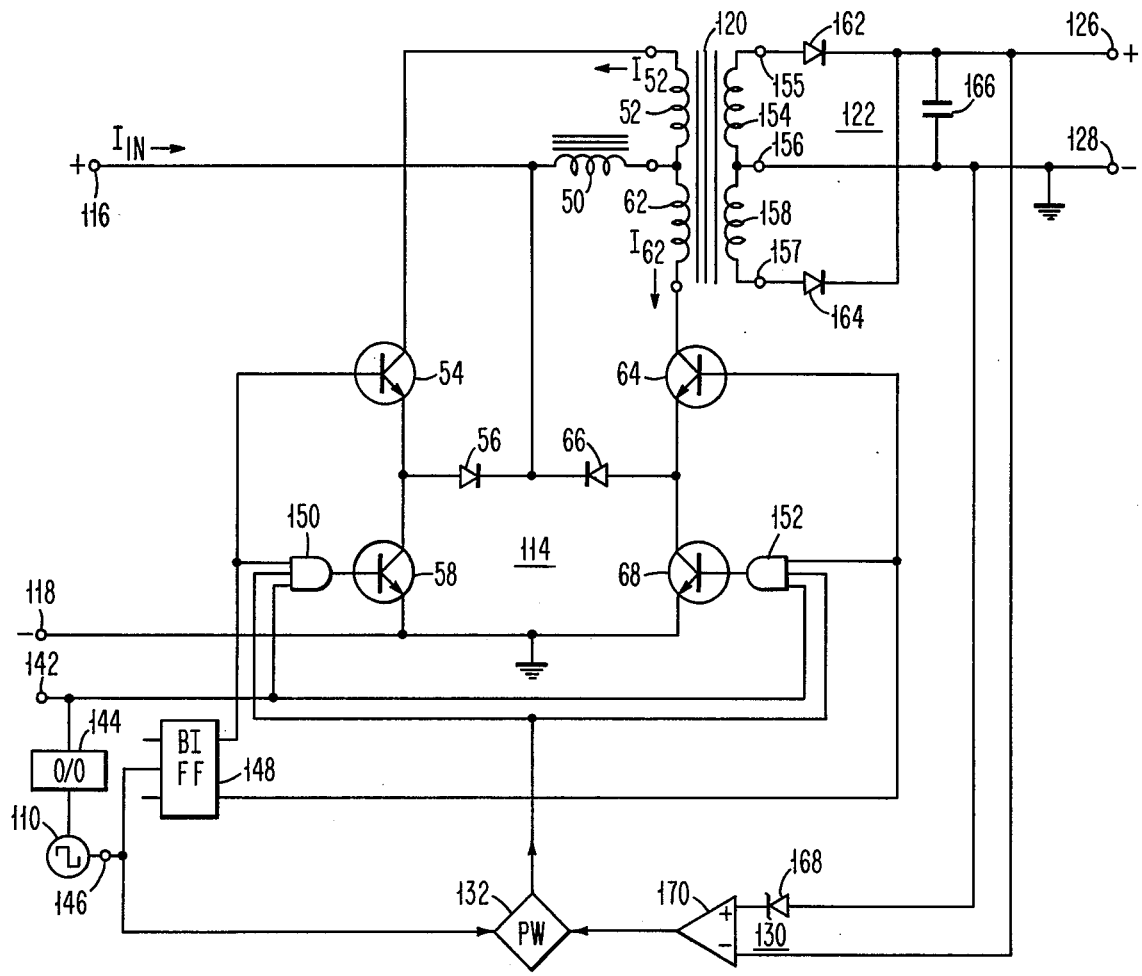
FIG. 2 is a schematic diagram of basic switching circuitry according to the invention.

A schematic diagram of basic switching circuitry 14 is shown in FIG. 2 wherein the reference numbers given previously are raised by 100 for components performing the same or closely analogous functions. The positive input voltage terminal 116 is connected through an inductor 50 to the center tap of a primary winding of a transformer 120. One-half 52 of the primary winding is connected to the collector electrode of a transistor 54. The emitter electrode of this transistor is connected through the diode 56 to the input terminal 116 and the inductor 50. The emitter electrode of the transistor 54 is also connected to the collector electrode of a transistor 58 having the emitter electrode thereon connected to the negative input terminal 118. In similar fashion, another half 62 of the primary winding of the transformer 120 is connected to the collector electrode of a transistor 64. The emitter electrode of this transistor is connected to a diode 66 and another transistor 68. Those skilled in the art will interchange transistor and component polarity to achieve the same effective circuitry according to conventional practice. A control terminal 142 is provided for the application of a control voltage of two levels for operation as discussed hereinafter. Control circuitry 144 is connected to the control terminal 142 and to the generator 110 for starting and stopping the latter as required. The output of the generator 110 delivered at a terminal 146 is applied to a binary flip-flop circuit 148 or the equivalent as will be discussed hereinafter. One output of the binary flip-flop circuit 148 supplied to the collector electrode of the transistor 54 and also to an input lead of an AND gating circuit 150, the output lead of which is connected to the base electrodes of the transistor 58. In similar fashion, the other output lead of the binary flip-flop circuit 148 is connected to a base electrode of the transistors 64 and one input lead of another AND gating circuit 152 having the output lead connected to the base of the transistor 68. The control terminal 142 is also connected in common to input leads of the AND gating circuits 150 and 152 for enabling both of these gating circuits only when the generator 110 is operating. The generator output terminal 146 is also connected to one input terminal of a pulse width modulator 132 having an output line connected in common to the AND gating circuits 150 and 152 for activating these gates in accordance with the output wave form of the pulse width modulating circuit 132. The latter circuit is operated to provide a squarewave of a part-cycle determined by the amplitude of the voltage across secondary winding of the transformer 120. As shown, the secondary winding comprises one-half winding 154 having a terminal 155 and another terminal 156. Another one-half winding 158 is connected to the common terminal 156 and another terminal 159. The output voltage across these terminals is alternating and in some instances is applied to a utilization circuit operating on alternating current. More often, a pair of rectifiers 162 and 164, together with a filter capacitor 166 supplies direct current to output terminals 126,128. Variations in the output voltage delivered at the latter terminals is preferably sensed as close to the load circuit as possible, however, for purposes of illustration, the connection to the sensing circuit is shown at the terminals 126,128. The sensing circuit 130 comprises a voltage reference zener diode 168 connected to the negative output voltage terminal 128 and an input terminal of differential amplifying circuit 170. The other input terminal, usually a negative terminal, is connected to the positive output voltage terminal 126. The output terminal of the amplifying circuit 170 is connected to the pulse width modulator 132 at the modulating input terminal. It will be understood by those skilled in the art that there is isolation between the primary and secondary circuits of the transformer for direct current provided in a conventional manner, for example, in the amplifying circuit 170, or as to be described hereinafter with reference to a practical embodiment of the invention. It will also be understood by those skilled in the art that circuit arrangements, either conventional or those to be described hereinafter with reference to the practical embodiment of the invention, will be interposed in the switching circuitry for accommodating large differences in operating voltages of the various components shown.

FIG. 3 is a set of schematic diagrams useful in an understanding of the operation of the switching circuitry according to the invention. In this figure, the input direct potential is represented by a battery 250 and transistors 54,58,64,68 by switches 254,258,264 and 268 respectively. At a time $t_1$, the switches 254 and 258 are closed under control of the clocking wave generator along with the pulse width modulator. Direct Current $I_A$ flows as shown by the arrow. The potential across the diode 56 is reversed whereby no current flows through this branch of the circuit. The instantaneous polarities at the terminals of the inductor 50 and the winding 52 are as shown. At a time $t_3$ switch 258 is opened, as shown in FIG. 3(b), and energy stored in the inductor 50 results in a current $I_B$ flowing as shown by the arrow through the diode 56. It should be noted that at no time in this cycle does current attempt to flow through the diode 56 in the reverse direction as is the case in many prior art circuit arrangements employing diodes, SCR, or transistors in the switching circuitry. Referring to FIG. 3(c) and 3(d), the operation on the other half cycle of the wave is substantially the same.

FIG. 4 is a graphical representation of waveforms appearing at pertinent points in the switching circuit according to the invention. These waveforms are idealized in the interest of clarity. The output of the clocking wave generator at terminal 146 is represented by the curve 201. A curve 205 represents the input current $I_{IN}$; portions 207,208 of the curve demonstrate the increase in current drawn as the switching transistors steer current through the individual halves 52,62 of the primary winding. Current through the individual windings is represented by curves 211 and 221. Portion 213 of the curve illustrates the increase in current as the transistors 54,58 direct current through the winding 52 and another portion 215 of the curve shows a decrease in current as the transistor 54 and diode 56 direct energy stored in the inductor 50 through the primary winding 52. Similarly, portions 223 and 225 illustrate the operation due to the transistors 64,68 and the diode 66 with respect to the winding 62. The output voltage is represented by a curve 231 which varies about an average output voltage represented by a line 233.

An important feature of the circuit topology according to the invention is illustrated in FIG. 5, depicting a prior art circuit arrangement. For an input voltage E represented by the battery 270, the voltage across the transistor 278 or 288 can rise under adverse circumstances to a value 2E, whereas in the circuit arrangement according to the invention, the voltage cannot rise above the voltage E under the worst case condition. This represents a very important advantage of the circuit arrangement according to the invention. Note also that the transistors 274 or 284 are turned-off only when the transistors 278 and 288 respectively have been turned-on; this is a different order from the functioning of the circuit according to the invention. The turning-off of transistors 274 and 284 with the turning-on of transistors 278 and 288 respectively will result in back current flow in the diodes 256 and 266 respectively; also a different situation than in the circuit according to the invention.

A prior art circuit shown and described in the U.S. patent to de la Lastra uses SCR devices in place of the transistor-diode combinations 274–256 and 284–266. Such SCR devices can be turned off only by reversing the voltage across them and thus inherently adversely affecting the circuit operation; which effects are absent in the circuit according to the invention.

While the circuitry thus far described is directly applicable in many applications, there are applications in which some auxiliary circuitry is advantageous. For example, the operating voltages in some applications may exceed the permissible voltage to which transistors and other logic circuitry may be subjected safely. Circuitry shown in FIG. 6 illustrates the point. Here a clocking waveform generator 110 is arranged to apply the clocking wave output to a J-K type flip-flop circuit 248 which ultimately is arranged to control current in transistors 354,358,364 and 368, across the electrodes of which voltage drops due to heavy current are sufficient to destroy conventional low level logical circuit components. Families of regulated power supplies of power output ratings are able to use the same logical control circuitry according to the invention with the circuitry to be described. The base electrode circuits of the inverter transistors 354,358,364,368 are applied by means of a transformer 310 having four secondary winding 311,312,313 and 314. The latter two secondary windings are on the transformer 310, although for clarity they are shown as being separated therefrom. The transformer 310 has a center tapped primary winding of two sections 317,318. These winding sections are connected to the J-K flip-flop circuit 248 by driver transistors 321,322. Using a single transformer 310 as shown, a pair of current interrupting transistors 331,332 are interposed in the loop circuits of the secondary winding 312 and 314 respectively. These transistors 331,332 are switched by means of AND gating circuits 350 and 352 which are enabled by the J-K flip-flop circuit 248 and actuated through an NOR gating circuit 336 by an auxiliary J-K flip-flop circuit 338 which is reset to an initial state by the clocking wave from the generator 110 and clocked by the output trailing edge of the pulse width modulator 170. The pulse width modulator circuit is cyclically reset in response to the timing wave obtained from the timing clocking waveform generator 110 which is applied to the width modulator 170 on the secondary side of the main power transformer through an isocoupler circuit 134 shown here as a pulse transformer.

The pulse transformer 134 is of conventional pulse transformer design. Input and output impedances of the transformer are matched and the other characteristics of the transformer are designed to enable steeply rising and falling leading and trailing edges of a pulse to be transformed with a minimum of loss with respect to the timing characteristics. In prior art arrangements, a secondary winding on the main power transformer has been used for obtaining an initial triggering pulse, however, severe phase lag and degraded waveforms are encountered. The pulse transformer 134 obviates these difficulties. Alternatively, an optocoupler may be substituted for the pulse transformer 134, for which arrangement a plug-in mounting is illustrated. Such an optocoupler 136 is shown on the output side of the pulse width modulator 170. In the example shown, the optocoupler 136 comprises a light emitting diode (LED) working into a phototransistor. Both components are of conventional design and such optocouplers are readily available commercially. In practice, both the input and output circuits of the pulse width modulator will generally be isolated by the same device, that is, by pulse transformers 134 or optocouplers 136 as better suit the situation.

The NOR gating circuit 336 is interposed in order that several regulator circuit arrangements within a system may be easily incorporated for insuring proper operation under a variety of conditions. A pair of terminals 342 are connected to the utilization circuitry for controlling the availability of the power supply. When the power supply is needed, a small voltage is applied across terminals 342 causing a LED in an optocoupler 344 to turn on a phototransistor. A level triggering circuit 370, for example, a Schmitt triggering circuit, monitors the internal bias voltage and produces a (logical 1) output level only if the internal bias voltage is at an acceptable operating level. The outputs of the level triggering circuit 370 and the optocoupler 344 form the inputs of a two-input AND gating circuit 371. The output of the clocking generator 110 is applied through an inverting circuit 382 which is subsequently connected to one of the inputs of a two-input AND gating circuit 374. The other input is connected to the output of the two-input AND gating circuit 371. The output of the AND gating circuit 374 is used as the S input of a R-S flip-flop circuit 372. The output of the optocoupler 344 is also fed into an inverting circuit 376 and forms one of the inputs of a two-input OR gating circuit 377. The other input is driven by an overcurrent condition level. The output of the OR gating circuit 377 is used as the R input of the R-S flip-flop circuit 372. In this scheme, the output Q of the R-S flip-flop circuit 372 switches to an up level (logical 1) state at the simultaneous presence of the clock pulse 110, the output from the level triggering circuit 370 and the output of the optocoupler 344, and goes to a down (logical 0) state if the output of the optocoupler 344 goes to 0 or an overcurrent condition exists.

The output of the two-input AND gating circuit 371 is also coupled to a time delay circuit 378, whose output is directed to one of the inputs of a two-input AND gating circuit 375. The other input is connected to the output of a two-input OR gating circuit 370, whose inputs are generated by overcurrent and overvoltage detecting circuits (not shown). The output of the two-input AND gating circuit 375 drives into the S input of a RS flip-flop circuit 384. The R input of the R-S flip-flop 384 is connected to the output of the inverting circuit 376. Hence, the P (or $\overline{Q}$) output of the R-S flip-flop circuit 384 is switched to an up level (or logical 1) state whenever the output of the optocoupler 344 is 0 and will switch to the down (or logical 0) state when the outputs of level triggering circuit 370 and the optocoupler 344 have been present for a time longer than the timing duration of the time delay circuit 378 and an overcurrent or overvoltage signal is present.

The outputs of flip-flop circuits 372 and 384 form the inputs to a two-input NAND gating circuit 373 which is connected to one of the inputs of the two-input NOR gating circuit 336.

In essence, the overall purposes of the arrangement just described are to remotely control the turn-on/turn-off of the regulator, to provide the means whereby the duty cycle of the switching transistors 358 and 368 is limited to a predetermined maximum current during the turn-on of the regulator and so prevent high inrush currents, and to provide a scheme to turn-off the regulator under normal running conditions (not on turn-on) should an overcurrent or an overvoltage condition occur, and to ensure that the regulator will turn on only if the internal bias voltage is at an acceptable level.

Those skilled in the art will readily interpose other machine running circuit arrangements for similar needs.

While the invention has been described and illustrated in terms of a preferred embodiment, and alternative structure has been offered, it is to be clearly understood that those skilled in the art will make additional changes without departing from the spirit and scope of the invention as defined in the appended claims.

The invention claimed is:

1. A regulating electric power circuit arrangement comprising
   input terminals at which direct energizing potential is applied,
   output terminals at which alternating potential is delivered,
   a transformer having a secondary winding connected to said output terminals and a primary winding having two terminals and a center tap,
   an inductor connected between said center tap and one of said input terminals
   one pair of transistors having collector electrodes individually connected to said terminals of said primary winding, and having base electrodes and emitter electrodes,
   a pair of diodes having anode electrodes individually connected to said emitter electrodes of said one pair of transistors and having cathode electrodes conneced in common to said one input terminal,
   another pair of transistors having collector electrodes individually connected to said emitter electrodes of said one pair of transistors, and having base electrodes, and having emitter electrodes connected in common to the other of said input terminals,
   a source of clocking voltage wave of given period,
   a binary flip-flop circuit having an input terminal directly connected to said source of clocking voltage wave and having complementary output terminals individually connected to said base electrodes of said one pair of transistors, a pair of AND gating circuits having input leads individually connected to said complementary output terminals of said flip-flop circuit, having other input leads and having output leads individually connected to said base electrodes of said other pair of transistors, a pulse width modulating circuit having one input terminal directly connected to said source of clocking voltage wave, a modulating input terminal and an output terminal connected in common to said other input leads of said AND gating circuits, circuitry connected to said output terminals for generating a direct voltage proportional to said alternating potential thereat, and a Zener diode having one terminal connected to said voltage generating circuit and having another terminal, a differential amplifying circuit having complementary input terminals connected across said other terminal of said Zener diode and said direct voltage generating circuitry and an output terminal connected to said modulating terminal of said modulating circuit.

2. A regulating electric power circuit arrangement comprising input terminals at which direct energizing potential is applied, output terminals at which alternating potential is delivered, a transformer having a secondary winding connected to said output terminals and a primary winding having two terminals and a center tap, an inductor connected between said center tap and one of said input terminals, one pair of transistors having like electrodes individually connected to said terminals of said primary winding, and having base electrodes and other electrodes, a pair of diodes having like electrodes individually connected to said other electrodes of said one pair of transistors and having opposite electrodes connected in common to said one input terminal, another pair of transistors having like electrodes, corresponding to said like electrode of said one pair of transistors, individually connected to said other electrodes of said one pair of transistors, and having base electrodes, and having other electrodes connected in common to the other of said input terminals, a source of clocking voltage wave of given period, a binary flip-flop circuit having an input terminal directly connected to said source of clocking voltage wave and having complementary output terminals individually connected to said base electrodes of said one pair of transistors, a pair of AND gating circuits having input leads individually connected to said complementary output terminals of said flip-flop circuit, having other input leads and having output leads individually connected to said base electrodes of said other pair of transistors, a pulse width modulator circuit having one input terminal directly connected to said source of clocking voltage wave, a modulating input terminal and an output terminal connected in common to said other input leads of said and gating circuits, circuitry connected to said output terminals for generating a direct voltage proportional to said alternating potential thereat, and a differential amplifying circuit having complementary input terminals connected across said direct voltage generating circuitry and an output terminal connected to said modulating terminal of said modulator circuit.

3. A regulating electric power circuit arrangement as defined in claim 2 and wherein said pulse width modulator circuit is arranged to control the conduction of said other pair of transistors in synchronism with the conduction of said one pair of diodes, the current flowing in one transistor of said one pair continues to flow through one of said pair of diodes in the forward direction until the half cycle alternates, whereby no current flows in the reverse direction in said diodes.

4. A regulating electric power circuit arrangement as defined in claim 3 and wherein said pulse width modulator circuit is arranged to be triggered at transitions of electric pulses, whereby the noise immunity and gain stability is improved.

5. A regulating electric power circuit arrangement as defined in claim 4 and incorporating isocoupling circuitry interposed between said generating circuitry and said modulator circuit and between said modulator circuit and said transistor base electrodes.

6. A regulating electric power circuit arrangement as defined in claim 5 and wherein said isocoupling circuitry comprises at least one pulse transformer.

7. A regulating electric power circuit arrangement as defined in claim 5 and wherein said isocoupling circuitry comprises at least one optocoupler device.

8. A regulating electric power circuit arrangement comprising input terminals at which direct energizing potential is applied, output terminals at which alternating potential is delivered, a transformer having a secondary winding connected to said output terminals and a primary winding having two terminals and a center tap, an inductor connected between said center tap and one of said input terminals, one pair of transistors having like electrodes individually connected to said terminals of said primary winding, and having base electrodes and other electrodes, a pair of diodes having like electrodes individually connected to said other electrodes of said one pair of transistors and having opposite electrodes connected in common to said one input terminal, another pair of transistors having like electrodes, corresponding to said like electrodes of said one pair of transistors, individually connected to said other electrodes of said one pair of transistors, and having base electrodes, and having other electrodes connected in common to the other of said input terminals, a source of clocking voltage wave of given period, a binary flip-flop circuit having a clocking input terminal directly connected to said source of clocking voltage wave and having complementary output terminals, another transformer having a center-tapped primary winding and four secondary windings with like terminals of said secondary winding individually connected to said base electrodes of said transistors and the other terminals of two of said secondary windings individually connected to the junctions of said like electrodes of said diodes and said other electrodes of said one pair of transistors, a third pair of transistors having base electrodes and other electrodes individually connected between the other of said secondary winding and said other of said input terminals, a fourth pair of transistors having base electrodes and other electrodes connected to said primary winding of said other transformer with the two transistors in series and means to apply bias potential between the center top of the primary winding and the junctions between the two transistors, and the base electrodes individually connected to said complementary output terminals of said flip-flop circuit, a pair of AND gating circuits having input leads individually connected to said complementary output terminals of said flip-flop circuit, having other input leads and having output leads individually connected to said base electrodes of said third pair of transistors, another flip-flop circuit having a clocking input terminal, a resetting input terminal directly connected to said source of clocking voltage wave and an output terminal connected in common to said other input leads of said AND gating circuit, a pulse width modulator circuit having one input terminal directly connected to said source of clocking voltage wave, a modulating input terminal and an output terminal connected in common to said clocking input terminal of said other flip-flop circuit, circuitry connected to said output terminals for generating a direct voltage proportional to said alternating potential thereat, a Zener diode, and a differential amplifying circuit having complementary input terminals connected in series with said Zener diode across said direct voltage generating circuitry and an output terminal connected to said modulating terminal of said modulator circuit.

* * * * *